United States Patent [19]

Bruno

[11] 4,054,560
[45] Oct. 18, 1977

[54] 1-(4-ACYLOXYALKYLAMINONAPH-THYLAZO)-4-NITROBENZENE DISPERSE DYES

[75] Inventor: Salvatore Anthony Bruno, Wilmington, Del.

[73] Assignee: E. I. Du Pont de Nemours and Company, Wilmington, Del.

[21] Appl. No.: 645,702

[22] Filed: Dec. 31, 1975

Related U.S. Application Data

[63] Continuation-in-part of Ser. No. 449,063, March 7, 1974, abandoned.

[51] Int. Cl.² .................... C09B 29/06; C09B 43/18
[52] U.S. Cl. .................... 260/196; 260/152; 260/347.7; 260/465 E; 260/570.6; 260/573; 560/55; 560/103; 560/255
[58] Field of Search .................................... 260/196

[56] References Cited

U.S. PATENT DOCUMENTS

| 2,045,324 | 6/1936 | Felix et al. | 260/196 X |
| 2,266,142 | 12/1941 | Adams | 260/196 X |
| 2,373,700 | 4/1945 | McNally et al. | 260/196 |
| 3,598,802 | 4/1971 | Weaver et al. | 260/196 |
| 3,817,977 | 6/1974 | Groebke | 260/196 |

FOREIGN PATENT DOCUMENTS

| 477,514 | 10/1969 | Switzerland | 260/205 |
| 1,029,226 | 5/1966 | United Kingdom | 260/207.1 |

*Primary Examiner*—Charles F. Warren
*Attorney, Agent, or Firm*—James A. Costello

[57] ABSTRACT

Disperse monoazo dyes, useful for the dyeing and printing of polyester, polyamide and cellulose acetate fibers in navy-blue shades, having the formula

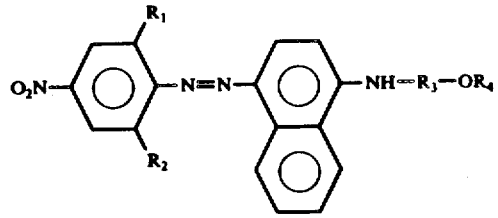

wherein $R_1$ is Br, Cl or CN; $R_2$ is CN or $NO_2$; is $C_{2-4}$—alkylene; and $R_4$ is a selected aliphatic, cycloaliphatic, or aromatic radical.

10 Claims, No Drawings

THERMOPLASTIC ADDITIVES FOR MOLDING COMPOUNDS

This is a continuation of application Ser. No. 544,455, filed Jan. 27, 1975, now abandoned.

This invention relates to thermoplastic additives for molding compositions.

In one of its more specific aspects, this invention relates to thermoplastic additives which, when incorporated in sheet and bulk molding compounds, improve the molding characteristics of the molding compounds.

Thermosetting resin prepolymers, which are frequently unsaturated polyesters which crosslink during curing to a thermoset condition, are well known. When thermosetting polyesters are employed in sheet and bulk molding compounds which are molded, the molded product invariably evidences shrink and sink.

In order to eliminate at least a portion of these difficulties, it is customary to incorporate into the thermosetting polyester resin at least one thermoplastic resin. The thermosetting resin and thermoplastic resin are mixed in the form of syrups and the combination of resins syrups is blended with fillers, crosslinking agents and gelling agents to form a moldable composition. These compositions upon molding form molded products containing the thermosetting polyester resin as the continuous phase with the thermoplastic resin dispersed therein.

The present invention provides a novel thermoplastic resin additive which is incorporated in a thermosetting polyester resin to reduce shrinkage and to improve the surface characteristics of the molded product.

According to this invention, there is provided a moldable composition comprising a thermoplastic additive produced by esterification of a mixture of glycols and oligomers with dimer or trimer acids. In one embodiment of the invention, a mixture of dimer and trimer acids is employed to produce the additive.

Also, according to the present invention there is provided a method of producing a moldable compound which comprises incorporating into a thermosetting polyester resin matrix a thermoplastic additive comprising the esterification product of a mixture of glycols and oligomers with dimer or trimer acids. In one embodiment of the invention, a mixture of dimer and trimer acids is employed to produce the additive.

The unsaturated thermosetting polyester resins, in themselves, are well known in the art as are the methods of preparing them. Such polyesters can be prepared by condensing an α,β-ethylenically unsaturated dicarboxylic acid or anhydride, or mixtures thereof, with a dihydric alcohol or mixtures of dihydric alcohols. In this respect, the term "dicarboxylic acid" is intended to include anhydrides of the corresponding acids. It is preferred that the carboxylic acid present in the polyester be of the unsaturated variety. Examples of preferred unsaturated dicarboxylic acids are maleic and fumaric acids. Dihydric alcohols which are useful in preparing the polyesters include propylene glycol, dipropylene glycol, diethylene glycol, 1,3-butanediol, and the like, and their mixtures.

The unsaturated, thermosetting polyester resins employable in the invention are produced under prior art conditions including a temperature within the range of from about 90° to about 400° F with materials such as toluhydroquinone, hydroquinone, methyl ether of hydroquinone, m-dinitrobenzene, and the like, being used to inhibit thermal polymerization of the ethylenic unsaturation. The polymerization is terminated preferably at an acid number less than about 100, with an acid number of about 30 being particularly suitable.

The monomer employable in this invention with which the resins are blended is a liquid monomer or mixture of monomers having at least one ethylenically active

group per molecule. The monomeric liquid substance must be copolymerizable with the unsaturated polyester and develop therewith a crosslinked or thermoset structure. The monomer must act as a solvent for the unsaturated polyester resin and the thermoplastic additive over a wide range of concentrations. Examples of suitable monomers are styrene, vinyl toluene, methyl methacrylate, butylmethacrylate and the like and mixtures thereof.

The thermoplastic additives of this invention are produced using conventional esterification techniques employing reactants such as are described hereinafter. Preferably, the esterification will be conducted at a temperature within the range of from about 100° to about 200° C and at atmospheric pressure, the reaction being initiated by catalysts such as dibutyl tin oxide and the like, the catalyst being employed in an amount of about 0.2 weight percent based upon the total weight of the reactants. Water is distilled from the reaction mixture employing a nitrogen sparge until the reaction is complete as indicated by cessation of the production of water.

The mixture of glycols and oligomers which can be used to produce the thermoplastic additive employed in the invention will have the following analyses.

| Composition | Composition, Weight Percent | |
|---|---|---|
| | Range | Preferred |
| Ethylene glycol | 3–10 | 4–10 |
| Diethylene glycol | 3–7 | 3–7 |
| Triethylene glycol | 0.1–5 | 0.1–3 |
| Ethylene glycol monomer | 12–35 | 14.5–30 |
| Diethylene glycol monomer | 1–13 | 2–12 |
| Mixed monomers | 3–15 | 5–13 |
| Oligomers | 27–67 | 40–65 |

The mixture will have a hydroxyl number within the range of from about 250 to about 650 with a preferred range being from about 300 to about 500.

In the above mixture, the monomers and the oligomers can be considered as having the following formulas:

Ethylene glycol monomer

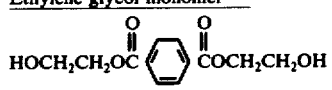

Diethylene glycol monomer

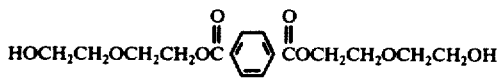

Mixed monomers

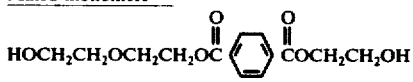

Oligomers

wherein m is, generally, greater than n and wherein the sum of m plus n is within the range of from 2 to 4.

Mixtures of glycols and oligomers such as described above are commercially available. One such commercially available material has a number average molecular weight, as measured by gel permeation chromatography, within the range of from about 660 to about 870 and a dispersity within the range of from about 1.3 to about 1.6.

The dimer acids which can be reacted with the mixtures of glycols and oligomers to produce the thermoplastic additives are aliphatic, dibasic acids whose structure is essentially that of a long chain dicarboxylic acid contaiing at least 36 carbon atoms in the chain with at least two appended alkyl side chains and at least one ethylenic bond. The alkyl groups will be of such structure that the dimer acids will have an approximate molecular weight of about 565 and an approximate equivalent weight of about 283.

One suitable dimer acid which is commercially available is "Empol 1016" from Emery Industries, Cincinnati. This material contains about 87% dimer acid having a molecular weight of about 565, about 13% trimer acid having a molecular weight of about 845 and a trace of monobasic acids having a molecular weight of about 282. This mixture has an acid value within the range of from about 190 to about 198, a saponification number of from about 194 to about 200, a neutral equivalent from about 284 to about 295 and a specific gravity of about 0.97.

Another suitable dimer acid commercially available is "Empol 1022" from Emery Industries, Cincinnati. This material contains about 75% dimer acid having a molecular weight of about 565, about 22% trimer acid having a molecular weight of about 845 and 3% monobasic acids having a molecular weight of about 282. This mixture has an acid value within the range of from about 189 to about 197, a saponification number of from about 191 to about 199, a neutral equivalent from about 284 to about 297 and a specific gravity of about 0.95.

Another suitable dimer acid commercially available is "Empol 1024" from Emery Industries, Cincinnati. This material contains about 75% dimer acid having a molecular weight of about 565, about 25% trimer acid having a molecular weight of about 845 and a trace of monobasic acids having a molecular weight of about 282. This mixture has properties comparable to those set out above for Empol 1022.

A suitable trimer acid commercially available is "Empol 1040" from Emery Industries, Cincinnati. This material contains about 20% dimer acid having a molecular weight of about 565, about 80% trimer acid having a molecular weight of about 845 and a trace of monobasic acids having a molecular weight of about 282. This mixture has an acid value within the range of from about 183 to about 191, a saponification number of from about 192 to about 200 and a specific gravity of about 0.97.

As stated, either the dimer acid or the trimer acid, or mixtures of the two acids, can be reacted with the mixture of glycols and oligomers to produce the thermoplastic additive. If a mixture of the acids is employed the weight ratio of the dimer acid to the trimer acid can be within the range of from about 0.3 to about 100 parts of the dimer acid to 1 part of the trimer acid. Preferably, this weight ratio will be within the range of from about 0.5 to about 1 part of the dimer acid to 1 part of the trimer acid.

The amount of dimer acid, or trimer acid, or mixture thereof, which is reacted with the mixture of glycols and oligomers to produce the thermoplastic additive can vary over a large range. Regardless of which acid or mixture of acids is employed, the weight ratio of acid, or mixture of acids, to the mixture of glycols and oligomers should preferably be within the range of from about 1.3 to about 3.5 parts of the acid, or mixture of acids, to 1 part of the mixture of glycols and oligomers. Preferably, the reactants will be employed so that upon completion of the esterification, the resulting reaction mixture will have an acid number within the range of from about 15 to about 30.

The thermoplastic additive resin can be introduced into the polyester resin in any suitable manner. Preferably, both resins will be employed in the form of monomer-containing syrups, the polyester resin being contained in a syrup in an amount of about 67 percent by weight and the thermoplastic additive being contained in a syrup in an amount of about 33 to about 40 percent by weight. On this basis, the thermoplastic additive will be employed in an amount within the range of from about 30 parts to about 50 parts by weight per 100 parts by weight of the total of the two resins. Preferably, the thermoplastic additive will be employed in an amount of about 35 to about 40 parts by weight per 100 parts by weight of the total of the two resins.

The following examples demonstrate the effectiveness of the thermoplastic additives of this invention in respect to improving the molding characteristics of molded polyester resins.

Example I demonstrates the preparation of a typical thermosetting polyester resin syrup. Each of the thermoplastics additives, the production of which is described later, was blended with this polyester resin to demonstrate molding improvements.

EXAMPLE I

A thermosetting polyester resin syrup was prepared from the following materials substantially in the following manner.

| Materials | Parts by Weight |
| --- | --- |
| Propylene glycol | 578.2 |
| Maleic Anhydride | 674.4 |
| Toluhydroquinone Solution (25% solution in styrene) | 6.8 |

The polyester resin syrup was prepared by charging all of the propylene glycol and one-third of the maleic anhydride into the reaction while using a continuous nitrogen sparge. The temperature of the contents of the reactor was raised to 190° F and about 4 hours after the first distillate, about one-half of the toluhydroquinone solution was added. When the reactor contents reached an acid value of about 35, the remainder of the toluhydroquinone was added. Thereafter, the remainder of the maleic anhydride was added at a rate of 10 to 15 parts per minute while controlling the temperature of the mixture at 300° F. Thereafter, the temperature of the mixture was held at 310° F to 320° F for 60 minutes, after which the temperature was increased to 400° F. The material in the reactor at this point had an acid number of 29 to 32 and 2 parts of the reactor contents diluted with one part of styrene has a viscosity of 21 to 25 at 350° F (SSU).

The contents of the reactor were cooled to 340° F and diluted with styrene in an amount of 90 parts of reactor contents to 10 parts of styrene to produce a composition stable for 30 minutes at 120° C before gelling.

In another vessel, 486.4 parts by weight of styrene and 0.125 parts by weight of mono-tertiary butylhydroquinone were mixed and held at a temperature within the range of 130° to 145° F. Thereafter, 1,138 parts of the polyester resin, produced as described above and a temperature of about 333° F, were added to the styrene-hydroquinone mixture to produce a thinned polyester syrup which, at a temperature of 180° F, had a viscosity in the range of 1500–2000 cps., a maximum water content of about 0.8 weight percent and a monomer content within the range of about 34 percent by weight.

EXAMPLE II

This example demonstrates the esterification of the glycol and oligomer mixture employing a dimer acid to produce an ester outside of the scope of this invention as indicated by the insolubility of the ester in styrene and methyl methacrylate.

200 grams of a glycol and oligomer mixture having a 304 hydroxyl number, 200 grams of a dimer acid having an acid number of 193 and 0.8g. of dibutyl tin oxide were introduced into a reactor fitted with a water condenser and a nitrogen purge system.

The reactants were heated to about 195° C under a nitrogen purge at which temperature water was distilled from the reactor. The reactor was maintained at 195° C for about 3 hours, at the end of which period no additional quantity of water was being distilled over, about 10 ml. of water having been collected.

The hot resin was recovered and portions were introduced into styrene and methyl methacrylate, individually. The resin was not completely soluble in either monomer.

The above demonstrates that at a weight ratio of about 1 part of the glycol and oligomer mixture to about 1 part of the dimer acid, the ester produced is unsatisfactory for employment in this invention due to its lack of complete solubility in a monomer which can serve as the common carrier for the thermoplastic additive and the polyester resin.

EXAMPLE III

A series of thermoplastic additives was prepared in the manner described in the previous example, employing the following materials and conditions indicated in Table I. Resin solubilities were as indicated.

TABLE I

| Thermoplastic Additive Number | I | II | III | IV | V | VI | VII | VIII | IX | X |
| --- | --- | --- | --- | --- | --- | --- | --- | --- | --- | --- |
| Glycol-Oligomer Mixture | | | | | | | | | | |
| Quantity, Grams | 150 | 150 | 180 | 450 | 480 | 150 | 150 | 160 | 160 | 180 |
| Hydroxyl Number | 304 | 304 | 304 | 304 | 304 | 304 | 304 | 304 | 304 | 304 |
| Acid, Gram Total | 300 | 260 | 240 | 900 | 832 | 260 | 330 | 320 | 330 | 310 |
| Dimer, gr. | 225 | 195 | 180 | 675 | 624 | 195 | 66 | 240 | 156 | 147 |
| Trimer, gr. | 66 | 57 | 53 | 198 | 183 | 57 | 264 | 80 | 74 | 163 |
| Monobasic, gr. | 9 | 8 | 7 | 27 | 25 | 8 | 0 | 0 | 0 | 0 |
| Acid No. of Mixture | 193 | 193 | 193 | 193 | 193 | 193 | — * | — | — | — |
| Reaction Conditions | | | | | | | | | | |
| Temperature, ° C | 195 | 195 | 192–195 | 195–196 | 195–197 | 195–197 | 195–198 | 195–196 | 195–197 | 195–198 |
| Dibutyl Tin Oxide, gms. | 0.9 | 0.8 | 0.8 | 2.5 | 2.5 | 0.8 | 0.9 | 0.9 | 0.9 | 0.9 |
| Time, Hrs. | 3.5 | 3.7 | 3 | 4.5 | 4.25 | 4.75 | 3 | 2.25 | 4.75 | 3.5 |
| Aqueous Distillate, ml. | 11.5 | 10 | 10.5 | 42 | 45 | 10.8 | 11.1 | 12.6 | 13.8 | 13.2 |
| Resin Solubility | | | | | | | | | | |
| Styrene | Soluble | Soluble | Soluble | Soluble | Soluble | Soluble | ** | Soluble | Soluble | Soluble |
| Methyl Methacrylate | Soluble | Soluble | Soluble | Soluble | Soluble | Soluble | | Soluble | Soluble | Soluble |
| Weight Ratios | | | | | | | | | | |
| Total acid to Glycol-Oligomer Mixture | 2.0 | 1.73 | 1.33 | 2 | 1.73 | 1.73 | 2.20 | 2.0 | 2.06 | 1.72 |
| Dimer to Trimer Acid | 3.4 | 3.4 | 3.4 | 3.4 | 3.4 | 3.4 | 0.25 | 3.0 | 2.1 | 0.9 |

* After 3.25 hrs. added 4.7 g. diethylene glycol
** Gellation

The above data demonstrate that suitable thermoplastic additives, soluble in a monomer, can be produced over a wide range of weight ratios of total acid to the glycol and oligomer mixture and of the dimer to the trimer acid.

EXAMPLE IV

The thermoplastic additives, designated as number I, II and III in Table I, were individually mixed with styrene to produce thermoplastic additive compositions containing about 40 percent solids.

The thermosetting polyester produced in Example I was mixed with styrene to produce a resin-containing composition containing about 67 percent solids.

The thermoplastic additives were then individually incorporated with the thermosetting polyester resin into molding compounds made up of the following materials:

|  | Weight, gms |
|---|---|
| Thermosetting Polyester (67% solids) | 840 |
| Thermoplastic Additive (40% solids) | 560 |
| Zinc Stearate | 52 |
| t-butyl perbenzoate | 14 |
| Calcium carbonate | 2074 |
| Magnesium Hydroxide | 42 |
| Glass | 1542 |

The glass was in the form of chopped fibers approximately ¼ inch in length.

The thermosetting polyester, the thermoplastic additive, the zinc stearate and the calcium carbonate were blended to form a smooth paste. The magnesium hydroxide was added to the paste and mixing was continued for two minutes. The chopped glass was then added and mixing was continued for an additional 2.5 minutes.

The three individual molding compounds, each incorporating one of the aforementioned thermoplastic additives, were molded into 12 inch by 18 inch flat sheets at a molding temperature within the range of from 290° to 300° F at a pressure of 1000 psi. Cure times were within the range of from 1 to 3 minutes. Five flat sheets were prepared from each molding compound. The average linear expansion of the molded sheets along the 12 inch and the 18 inch dimensions was as follows, each value given being the average of five determinations.

|  | Expansion, mils/inch | |
|---|---|---|
| Polymer | 12" dimension | 18" dimension |
| I | 0.19 | 0.18 |
| II | 0.21 | 0.27 |
| III | 0.06 | 0.25 |

The molding compound, when comprised only of the thermosetting polyester, in the absence of the thermoplastic additive, exhibits shrinkages of approximately 3.5 to 4.0 mils per inch.

Flat sheets, incorporating each of the thermoplastic additives prepared as described above, were totally immersed in boiling water for a period of 6 days. At the end of that period, none of the sheets had blistered.

Flat sheets, comprised of a molding compound comprising the thermosetting resin and the thermoplastic additive, also exhibited resistance to warpage when molded and cooled.

It is evident from the foregoing that the method of this invention provides thermoplastic additives which, when incorporated in polyester resins, enable the production of molded products having acceptable molding characteristics. As such, this invention represents a significant savings in scarce materials inasmuch as one glycol-oligomer mixture which can be satisfactorily employed is the waste product of a process which produces poly(ethylene terephthalate), which waste product heretofore had little, if any, utility and presented a disposal problem.

It will be evident from the foregoing that various modifications can be made to this invention. Such, however, are considered within the scope of the invention.

What is claimed is:

1. A moldable composition comprising a thermosetting polyester resin and a thermoplastic resin, said thermoplastic resin being the reaction product of a mixture of glycols and oligomers with dimer or trimer acids, said dimer acid being an aliphatic, dibasic, long chain acid having at least 36 carbon atoms in said chain and having two alkyl side chains and having at least one ethylenic bond, said trimer acid being an aliphatic, tribasic, long chain acid having at least 54 carbon atoms in said chain and having at least three alkyl side chains and at least one ethylenic bond, said oligomers having the general formula:

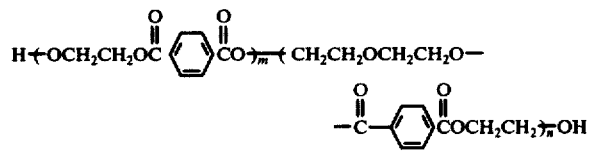

wherein m is, generally, greater than n and wherein the sum of m plus n is within the range of from 2 to 4.

2. The moldable composition of claim 1 in which said mixture of glycols and oligomers comprises ethylene glycol, diethylene glycol, triethylene glycol, ethylene glycol monomer, and diethylene glycol monomer.

3. The moldable composition of claim 1 in which said dimer or said trimer acid is employed in an amount within the range of from about 1.3 to about 3.5 parts by weight per part by weight of said mixture of glycols and oligomers.

4. The moldable composition of claim 1 in which a mixture of dimer acids and trimer acids is employed.

5. The moldable composition of claim 4 in which said dimer acid is employed in an amount within the range of from about 0.3 to about 100 parts by weight per part by weight of said trimer acid.

6. The moldable composition of claim 1 in which said thermoplastic resin is employed in said composition in an amount within the range of from about 30 to about 50 parts by weight per 100 parts by weight of the total of said polyester resin and said thermoplastic resin.

7. A method of improving the molding characteristics of a molding compound comprising a thermosetting polyester which comprises incorporating in said molding compound a thermoplastic resin comprising the reaction product of a mixture of glycols and oligomers with dimer or trimer acids, said dimer acid being an aliphatic, dibasic, long chain acid having at least 36 carbon atoms in said chain and having two alkyl side chains and having at least one ethylenic bond, said trimer acid being an aliphatic, tribasic, long chain acid having at least 54 carbon atoms in said chain and having at least three alkyl side chains and at least one ethylenic bond, said oligomers having the general formula:

-continued

wherein m is, generally, greater than n and wherein the sum of m plus n is within the range of from 2 to 4.

8. The method of claim 7 in which said mixture of glycols and oligomers comprises ethylene glycol, diethylene glycol, triethylene glycol, ethylene glycol monomer and diethylene glycol monomer.

9. The method of claim 7 in which said dimer or said trimer acid is employed in an amount within the range of from about 1.3 to about 3.5 parts by weight per part by weight of said mixture of glycols and oligomers.

10. The method of claim 7 in which a mixture of dimer acids and trimer acids is employed.

11. The method of claim 10 in which said dimer acid is employed in an amount within the range of from about 0.3 to about 100 parts by weight per part by weight of said trimer acid.

12. The method of claim 7 in which said thermoplastic resin is employed in said composition in an amount within the range of from about 30 to about 50 parts by weight per 100 parts by weight of the total of said polyester resin and said thermoplastic resin.

* * * * *